United States Patent
Fennessy

[11] 3,910,772
[45] Oct. 7, 1975

[54] APPARATUS FOR REACTIVATING CATALYST SURFACES IN AN EXHAUST SYSTEM

[75] Inventor: Francis J. Fennessy, East Hartford, Conn.

[73] Assignee: United Technologies Corporation, Hartford, Conn.

[22] Filed: Jan. 22, 1974

[21] Appl. No.: 435,610

[52] U.S. Cl. ......... 23/288 F; 23/288 B; 23/288 FC; 60/294; 60/295
[51] Int. Cl.² .................... B01J 8/00; F01N 3/15
[58] Field of Search ........ 23/288 F, 288 R, 288 FC, 23/288 B; 134/6, 8; 60/295

[56] References Cited
UNITED STATES PATENTS

| | | | |
|---|---|---|---|
| 1,664,263 | 3/1928 | Puening | 134/8 X |
| 1,690,243 | 11/1928 | Parrish | 134/8 X |
| 2,004,065 | 6/1935 | Grison | 23/288 F UX |
| 2,772,147 | 11/1956 | Bowen et al. | 23/288 F |
| 2,880,079 | 3/1959 | Cornelius | 23/288 F UX |
| 3,043,095 | 7/1962 | Sturtz | 23/288 F UX |
| 3,110,300 | 11/1963 | Brown et al. | 23/288 F X |
| 3,423,186 | 1/1969 | Darr et al. | 134/6 X |
| 3,476,522 | 11/1969 | Stovall | 23/285 |
| 3,477,227 | 11/1969 | Bettega et al. | 23/288 F X |
| 3,522,016 | 7/1970 | Groves et al. | 134/8 X |
| 3,691,346 | 9/1972 | Dyer et al. | 23/288 F X |
| 3,740,925 | 6/1973 | Gothard | 23/288 R X |

Primary Examiner—Barry S. Richman
Attorney, Agent, or Firm—Charles A. Warren

[57] ABSTRACT

The exhaust gases from an internal combustion pass through an exhaust system including a catalytic device that eliminates the pollutants from the exhaust. The device includes a sleeve having a catalytic surface with an abrasive structure by which periodically the catalyst surfaces on the sleeve are reactivated to assure adequate effectiveness.

3 Claims, 1 Drawing Figure

U.S. Patent Oct. 7,1975 3,910,772

APPARATUS FOR REACTIVATING CATALYST SURFACES IN AN EXHAUST SYSTEM

BACKGROUND OF THE INVENTION

This invention relates to the reactivation of the catalytic surfaces in a pollution prevention device in the exhaust system of an internal combustion engine particularly in motor vehicles. Since such surfaces become inactive in a relatively short time as a result of the reaction with the exhaust fumes, reactivation must be done either continuously or periodically to assure an adequate pollutant removal or conversion function. Such reactivation must not be destructive of the catalyst and must be dependable in motor vehicles where adequate inspection to assure proper operation is nonexistant.

STATEMENT OF THE INVENTION

One feature of the invention is a device for periodically reactivating the catalyst surfaces in an antipollution exhaust system for internal combustion engines. Another feature is the intermittent actuation of the reactivating device, especially in automotive vehicles, to assure an active catalyst surface during engine operation.

According to the invention, the catalyst surface is in the form of a cylinder over which the exhaust gases flow and the catalyst serves to eliminate the pollutants from the gases either by converting the pollutant gases to nonpolluting gases or by absorption or adsorption of the pollutant material and the catalyst surface is reactivated by intermittently passing abrasive material over the catalyst surface. The abrasive is in the form of blocks and these blocks are intermittently moved over the catalyst surface by a mechanism actuated by an engine function such as, for example, the blocks may be set in motion each time the engine starter is energized. The essential feature is the intermittent actuation frequently enough to assure an active catalyst surface.

Other features and advantages of the invention will be apparent from the specification and claims and from the accompanying drawing which illustrates an embodiment of the invention.

DESCRIPTION OF THE PREFERRED EMBODIMENT

Figure 1:
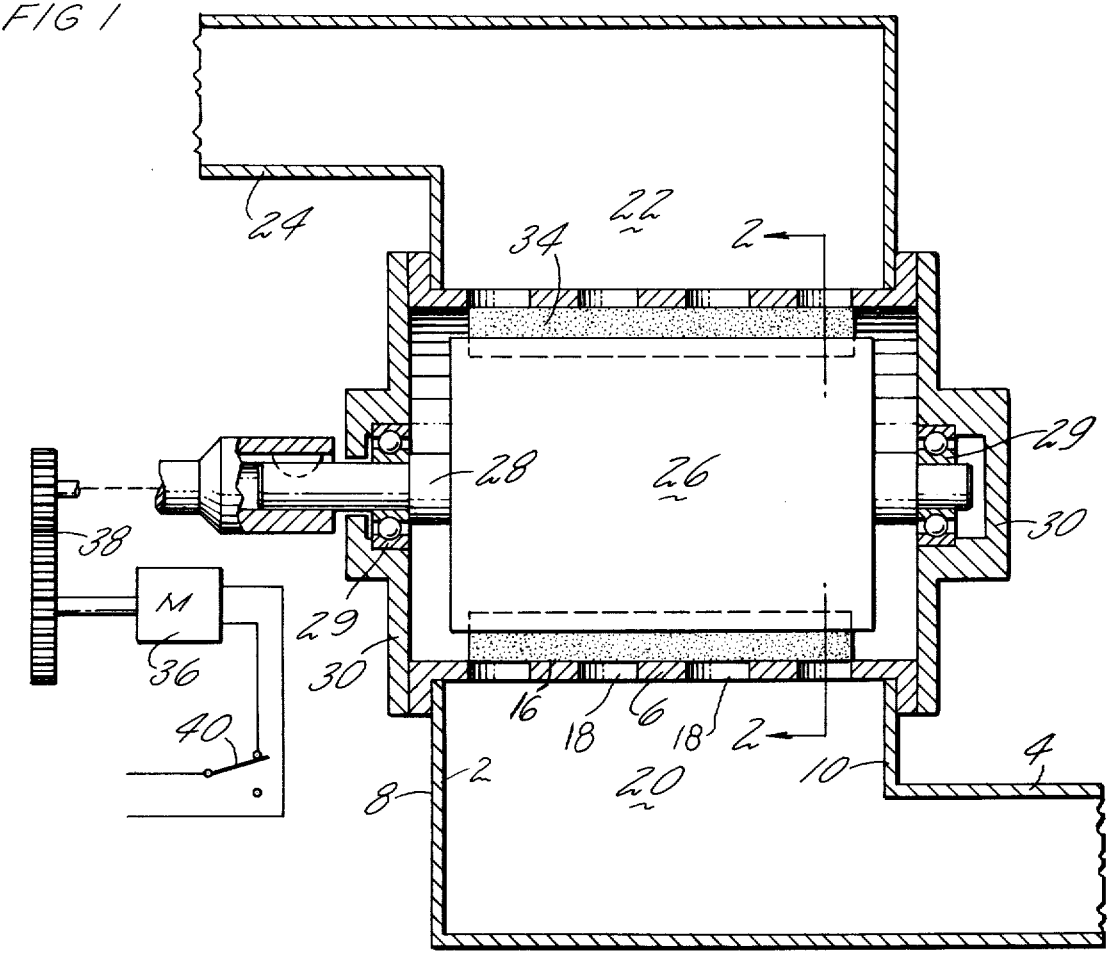
FIG. 1 is a sectional view through the antipollutant device.
Figure 2:
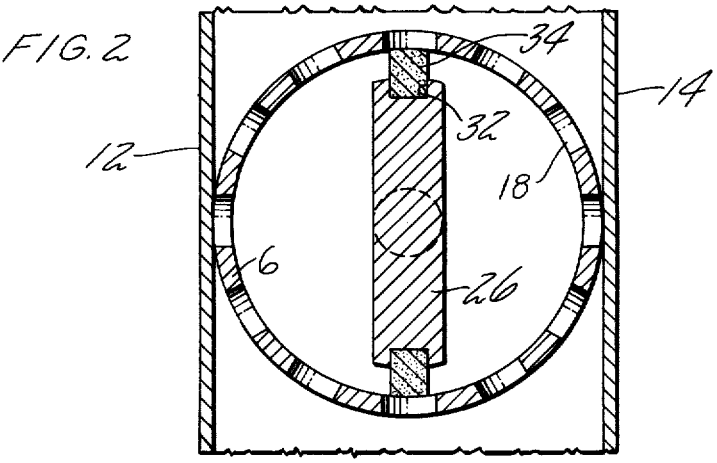
FIG. 2 is a fragmentary sectional view along the line 2—2 of FIG. 1.

Referring to the drawing, the device is shown in an exhaust system for an automotive vehicle and includes a housing 2 having an inlet 4 at the bottom connected to the engine exhaust manifold. The housing 2 has a hollow cylinder 6 positioned horizontally therein, extending between opposite side walls 8 and 10 of the housing, and contacting the other side walls 12 and 14, FIG. 2. The inner surface 16 of the cylinder is coated with any of the well known catalysts, for example, an activated platinum containing material.

The cylinder has a plurality of holes 18 therein throughout its periphery and these holes permit the flow of exhaust gas through the cylinder transversely from a chamber 20 below the cylinder and communicating with the inlet 4 to a chamber 22 above the cylinder and communicating with an outlet 24, the latter being connected to the tailpipe, now shown.

Positioned within the cylinder 6 is a support 26 carried by a shaft 28 concentric to the cylinder and journaled in bearings 29 in brackets 30 attached to the end walls 8 and 10. The support 226 is in the form of a plate having grooves 32 in opposite edges to receive blocks 34 of abrasive material. The outer surfaces of these blocks engage the catalyst surface on the cylinder and serve to reactivate the catalyst by rotation of the plate within the cylinder. The plate is generally in a vertical position and does not interfere with the flow of exhaust gas through the cylinder.

To rotate the plate about its axis, the shaft 28 is driven from a motor 36 through gearing 38 arranged to drive the plate for a selected number of times with the plate coming to rest again in a vertical position. The motor 36 may be actuated by a switch 40 that is closed each time the engine is started to assure intermittent operation of the plate 26. Such gearing is well known and need not be described in detail.

Other engine functions may be used to activate the switch 40 as, for example, whenever the alternator drops below a selected output as, for example, when the engine is idling if it is found that activation at engine starting is not frequent enough.

It should be understood that the invention is not limited to the particular embodiments shown and described herein, but that various changes and modifications may be made without departing from the spirit or scope of this novel concept as defined by the following claims.

Having thus described typical embodiments of my invention, what I claim as new and desire to secure by Letters Patent of the United States is:

1. A catalytic reactor for purifying exhaust gas comprising:
   a chamber having an inlet for exhaust gas at one end thereof and an outlet for purified exhaust gas at the opposite end thereof,
   a cylinder transversely positioned in said chamber relative to the flow path of exhaust gas through said chamber, said cylinder being tangent to and contacting opposite sidewalls of said chamber and being perforated for transverse flow of exhaust gas therethrough and having a catalytic coating on its inner surface,
   abrasive means in the form of abrasive blocks positioned within and extending lengthwise of the cylinder and in contact with the inner surface thereof,
   means movably mounting said abrasive means within said cylinder and
   means for intermittently actuating said mounting means to abrade and reactivate the catalytic coating on said cylinder.

2. The catalytic reactor of claim 1, wherein said mounting means includes a plate rotatably mounted within said cylinder, said plate having opposite edges parallel to the axis of said cylinder and closely adjacent said inner surface, said abrasive blocks being mounted thereto at said opposite edges.

3. The catalytic reactor of claim 2, wherein said mounting means further includes bearings located in walls of said chamber at opposite ends of said cylinder, said bearings rotatably supporting said plate.

* * * * *